(12) United States Patent
Kimura et al.

(10) Patent No.: US 9,186,940 B2
(45) Date of Patent: Nov. 17, 2015

(54) RECOMMENDED TIRE SELECTION SYSTEM

(75) Inventors: Masanao Kimura, Toshima-ku (JP); Takahiko Kato, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 274 days.

(21) Appl. No.: 13/992,810

(22) PCT Filed: Nov. 18, 2011

(86) PCT No.: PCT/JP2011/076645
§ 371 (c)(1),
(2), (4) Date: Jun. 10, 2013

(87) PCT Pub. No.: WO2012/081357
PCT Pub. Date: Jun. 21, 2012

(65) Prior Publication Data
US 2013/0262363 A1 Oct. 3, 2013

(30) Foreign Application Priority Data
Dec. 13, 2010 (JP) ................................. 2010-277356

(51) Int. Cl.
*G06N 5/02* (2006.01)
*B60C 99/00* (2006.01)
*B60C 11/24* (2006.01)
*B60C 11/02* (2006.01)

(52) U.S. Cl.
CPC ............ *B60C 99/006* (2013.04); *B60C 11/246* (2013.04); *G06N 5/02* (2013.01); *B60C 11/02* (2013.01)

(58) Field of Classification Search
CPC ....................................................... B60C 11/03
See application file for complete search history.

(56) References Cited

U.S. PATENT DOCUMENTS

2010/0241307 A1   9/2010   Hara
2011/0220255 A1   9/2011   Sakamoto

FOREIGN PATENT DOCUMENTS

| CN | 101778726 A | 7/2010 | |
| EP | 0464660 A1 * | 6/1991 | ..................... 706/46 |
| JP | 2002-092404 A | 3/2002 | |
| JP | 2004-252858 A | 9/2004 | |
| JP | 2009-040179 A | 2/2009 | |

(Continued)

OTHER PUBLICATIONS

Taiwanese Official Action Letter, dated Jul. 24, 2014, issued in counterpart Taiwanese Patent Application No. 100145717.

(Continued)

*Primary Examiner* — David Vincent
*Assistant Examiner* — Ola Olude Afolabi
(74) *Attorney, Agent, or Firm* — Sughrue Mion, PLLC (57) ABSTRACT

A recommended tire selection system 100 comprises a driving condition obtaining unit 101 that obtains a driving condition of a vehicle on which the recommended tire is loaded, a retread necessity obtaining unit 103 that obtains the retread necessity to replace the tread; a performance decision unit 105 that decides a rolling resistance and a wear resistance of the recommended tire based on the obtained driving condition, and decides a casing durability based on the obtained retread necessity; and a selection unit 107 that selects a recommended tire that is a combination of a tread and a casing, fulfilling the decided rolling resistance, wear resistance, and casing durability.

4 Claims, 5 Drawing Sheets

(56) References Cited

FOREIGN PATENT DOCUMENTS

| JP | 2009-092556 A | 4/2009 |
| TW | 569116 B | 1/2004 |

OTHER PUBLICATIONS

International Search Report for PCT/JP2011/076645 dated Feb. 21, 2012.

* cited by examiner

| TREAD PATTERN | ROLLING RESISTANCE (RR) | WEAR RESISTANCE (WEAR LIFE) | COMPATIBLE VEHICLE MODEL | MOUNTABLE POSITION | SIZE |
|---|---|---|---|---|---|
| M123 II | LOW | LOW | BUS | ALL WHEELS | 225/80R17.5 275/70R22.5 ... |
| M123 | LOW | LOW | TRUCK·BUS | ALL WHEELS | 225/80R17.5 275/70R22.5 ... |
| D45 III | HIGH | HIGH | TRUCK·BUS·DUMP TRUCK | STEERING WHEEL | 215/70R17.5 235/70R17.5 ... |
| ... | HIGH | HIGH | DUMP TRUCK·TRAILER | STEERING WHEEL | 225/80R17.5 275/70R22.5 ... |

200

(b)

| CASING | CASING DURABILITY |
|---|---|
| AA | LOW |
| BB | LOW |
| CC | HIGH |
| ... | LOW |

RECOMMENDED TIRE SELECTION SYSTEM

CROSS REFERENCE TO RELATED APPLICATIONS

This application is a National Stage of International Application No. PCT/JP2011/076645 filed Nov. 18, 2011, claiming priority based on Japanese Patent Application No. 2010-277356 filed Dec. 13, 2010, the contents of all of which are incorporated herein by reference in their entirety.

FIELD OF THE INVENTION

The present invention relates to a recommended tire selection system that selects a recommended tire that is a combination of a tread and a casing.

BACKGROUND OF THE INVENTION

Conventionally, there is known a so-called retread tire that is mainly targeted for use with pneumatic tires as those seen on long-distance trucks and busses. In the retread tire, when the worn-out tread is replaced, the casing comprising a carcass and a bead can be re-used.

Retread tires are manufactured by pasting a once vulcanized tread rubber (pre-cured tread) onto the casing (for example, PTL 1). Therefore, in other words, the tread and the casing can be selected separately.

That is, the use of vulcanized parts for the tread and the casing permits manufacture of a tire using a simplified vulcanization mold. As a result, tires that in the past could only be manufactured in a tire factory can now be manufactured and sold in places other than the tire factory. This means, a sales location such as a tire shop can have a stock of various treads and casings with different properties, and can appropriately manufacture and sell a variety of tires that is a combination of the tread and the casing.

CITATION LIST

Patent Literature

Patent Literature 1: Japanese Patent Application Publication No. 2009-040179 (Page 5, FIG. 1)

SUMMARY OF THE INVENTION

As stated above, if the tread and the casing can be selected separately, a user of pneumatic tires can freely select a combination of a tread and a casing depending on driving conditions of a vehicle and its model.

However, even if such selection is made possible, it can be assumed that the selection, of the combination of a tread and a casing, is made based on experience of the sales staff and user preference. Therefore, there is a problem in that a combination of a tread and casing which are appropriate according to a vehicle driving condition, etc., is not necessarily selected.

Therefore, the present invention has been made in view of this situation, and an object thereof is to provide a recommended tire selection system, capable of presenting a recommended tire that is a combination of an appropriate tread and casing, depending on a vehicle driving condition, etc.

A characteristic of the present invention is summarized as a recommended tire selection system (a recommended tire selection system 100) that selects a recommended tire that is a combination of a toric casing including at least a carcass and a bead, and a tread that is pasted onto a peripheral unit of the casing and comes into contact with the road, the system, comprising: a driving condition obtaining unit (a driving condition obtaining unit 101) that obtains a driving condition of a vehicle on which the recommended tire is loaded; a retread necessity obtaining unit (a retread necessity obtaining unit 103) that obtains the retread necessity to replace the tread; a performance decision unit (a performance decision unit 105) that decides a rolling resistance and a wear resistance of the recommended tire based on the driving condition obtained by the driving condition obtaining unit, and decides a casing durability based on the retread necessity obtained by the retread necessity obtaining unit; and a selection unit (a selection unit 107) that selects a recommended tire that is a combination of a tread and a casing, fulfilling the rolling resistance, the wear resistance, and the casing durability, decided by the performance decision unit.

In the characteristic of the present invention mentioned above, the recommended tire selection system may comprise an inquiry unit (an inquiry unit 109) that inquires which to prioritize the rolling resistance or the casing durability, in cases where the rolling resistance and the casing durability decided by the performance decision unit contradict each other.

In the characteristic of the present invention mentioned above, the driving condition obtaining unit may obtain the pavement situations, of roads on which the vehicle drives, as the driving condition.

DESCRIPTION OF THE EMBODIMENT

Subsequently, an embodiment of a recommended tire selection system according to the present invention will be described with reference to drawings. In the following description of the drawings, the same or similar reference numerals are used to designate the same or similar parts. It will be appreciated that the drawings are schematically shown and the ratio and the like of each dimension are different from the real ones.

Therefore, a specific dimension should be determined in view of the following description. Moreover, among the drawings, the respective dimensional relations or ratios may differ.

(1) Functional Block Configuration of Recommended Tire Selection System

Figure 1:
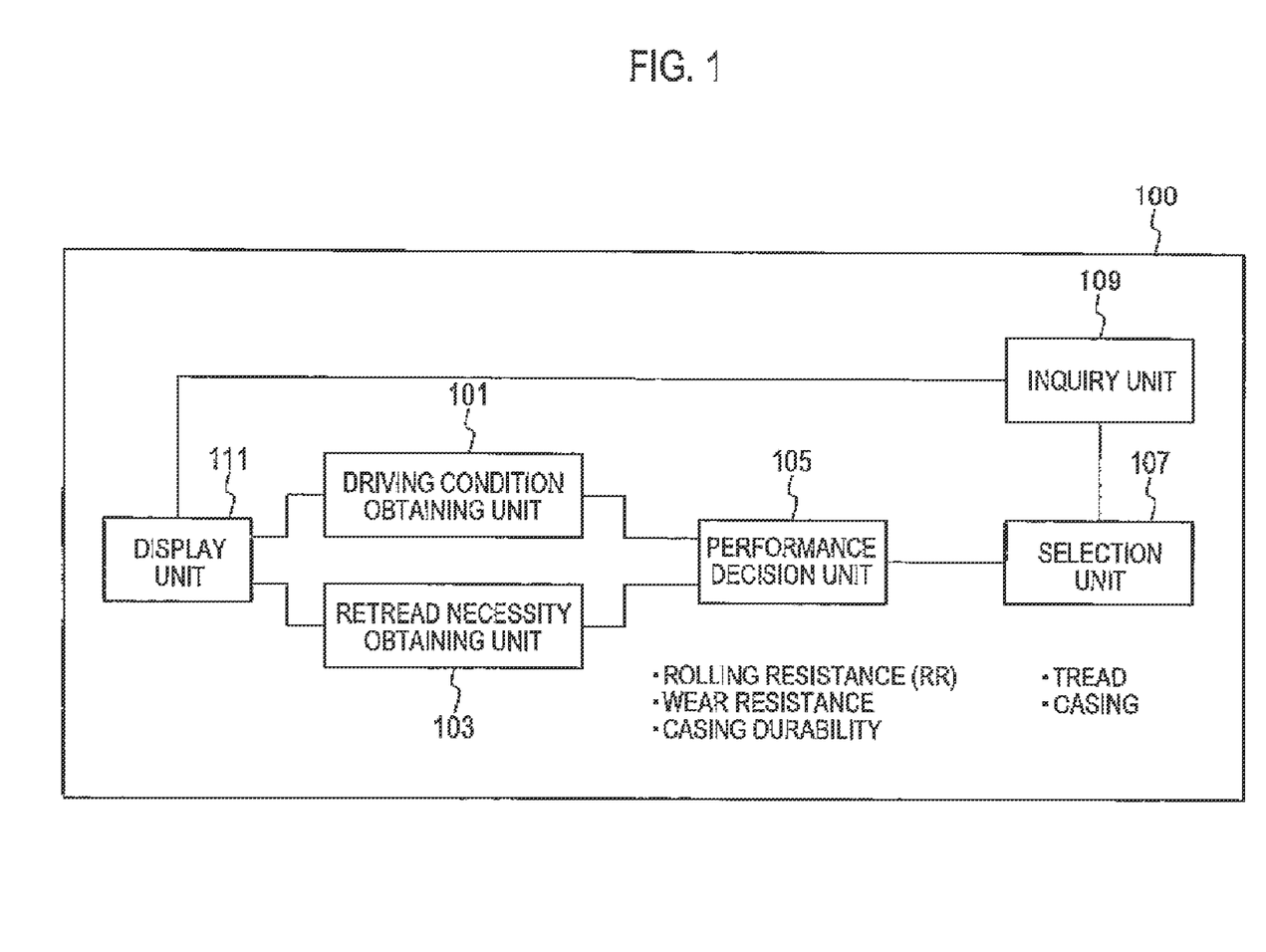
FIG. 1 is a functional block configuration diagram of a recommended tire selection system 100 according to an embodiment of the present invention.

FIG. 1 is a functional block configuration diagram of a recommended tire selection system 100 according to the present embodiment. The recommended tire selection system 100 selects a recommended tire that is a combination of a tread and a casing based on a driving condition of a vehicle on which the tire is loaded, and presents the selected recommended tire to a user.

Note that in this embodiment, the casing is of a toric structure comprising at least a carcass and a bead. Also, the tread includes a portion contacting a road surface when the tire is loaded on a vehicle, and is a portion pasted onto a peripheral unit of the casing. On the tread, tread patterns are formed under consideration of drainage and maneuverability.

As illustrated in FIG. 1, the recommended tire selection system 100 includes a driving condition obtaining unit 101, a retread necessity obtaining unit 103, a performance decision unit 105, a selection unit 107, an inquiry unit 109, and a display unit 111.

The driving condition obtaining unit 101 obtains the driving condition of the vehicle on which the recommended tire is to be loaded. Specifically, the driving condition obtaining unit 101 obtains a pavement situation of a road on which the vehicle, on which the recommended tire is to be loaded, will be driving, as the driving condition. For example, the driving condition obtaining unit 101 obtains information such as whether the vehicle mainly drives on paved roads with few bumps (for example, highways), or it drives mainly on unpaved roads.

The driving condition obtaining unit 101 has the display unit 111 display a screen to ask the user of the recommended tire to enter information regarding the driving condition, and obtains the driving condition entered through an input interface such as a keyboard or a touch panel (not illustrated).

The retread necessity obtaining unit 103 obtains whether there is a retread necessity to replace the tread. Specifically, the retread necessity obtaining unit 103 obtains whether to only replace the tread with a new one, instead of disposing the tire, when a tread is worn out and the remaining groove depth has reached its limit of usage.

The retread necessity obtaining unit 103 has the display unit 111 display a screen to ask the user of the recommended tire to enter information regarding this necessity, and obtains the necessity entered through an input interface such a keyboard or a touch panel (not illustrated).

The performance decision unit 105, based on the driving condition obtained by the driving condition obtaining unit 101 and the retread necessity obtained by the retread necessity obtaining unit 103, decides the performance requirements for the recommended tire, more specifically, the performance of the tire.

The performance decision unit 105 decides a rolling resistance and a wear resistance of the recommended tire, based on the driving condition (pavement situation) obtained by the driving condition obtaining unit 101. Specifically, in cases where the pavement situation is good, the performance decision unit 105 decides that the low rolling resistance is the required performance. Meanwhile, the performance decision unit 105 decides that in cases where the pavement situation is good, the wear resistance can be low. This is because it can be presumed that a high wear resistance is unnecessary when the pavement situation is good.

Also, the performance decision unit 105 decides the casing durability based on the retread necessity obtained by the retread necessity obtaining unit 103. Specifically, in cases where there is a need to retread, the performance decision unit 105 decides that the high casing durability is the required performance. This is because, when retreading is necessary, it can be presumed that the casing will be in use for a longer period of time and therefore requires higher durability. Also, when the casing durability is increased, in general, it becomes more difficult to lower the rolling resistance. For this reason, the performance decision unit 105 decides that the rolling resistance can be high to some extent.

The selection unit 107 selects a recommended tire that is a combination of a tread and a casing that fulfill the rolling resistance, the wear resistance, and the casing durability decided by the performance decision unit 105. Specifically, the selection unit 107 selects a tread that fulfills the required performance. Also, the selection unit 107 selects a casing that fulfills the required performance. Note that when there are a plurality of treads and casings that fulfill the required performance, the selection unit 107 can select a plurality of recommended tires (a combination of a tread and a casing).

Figure 3:
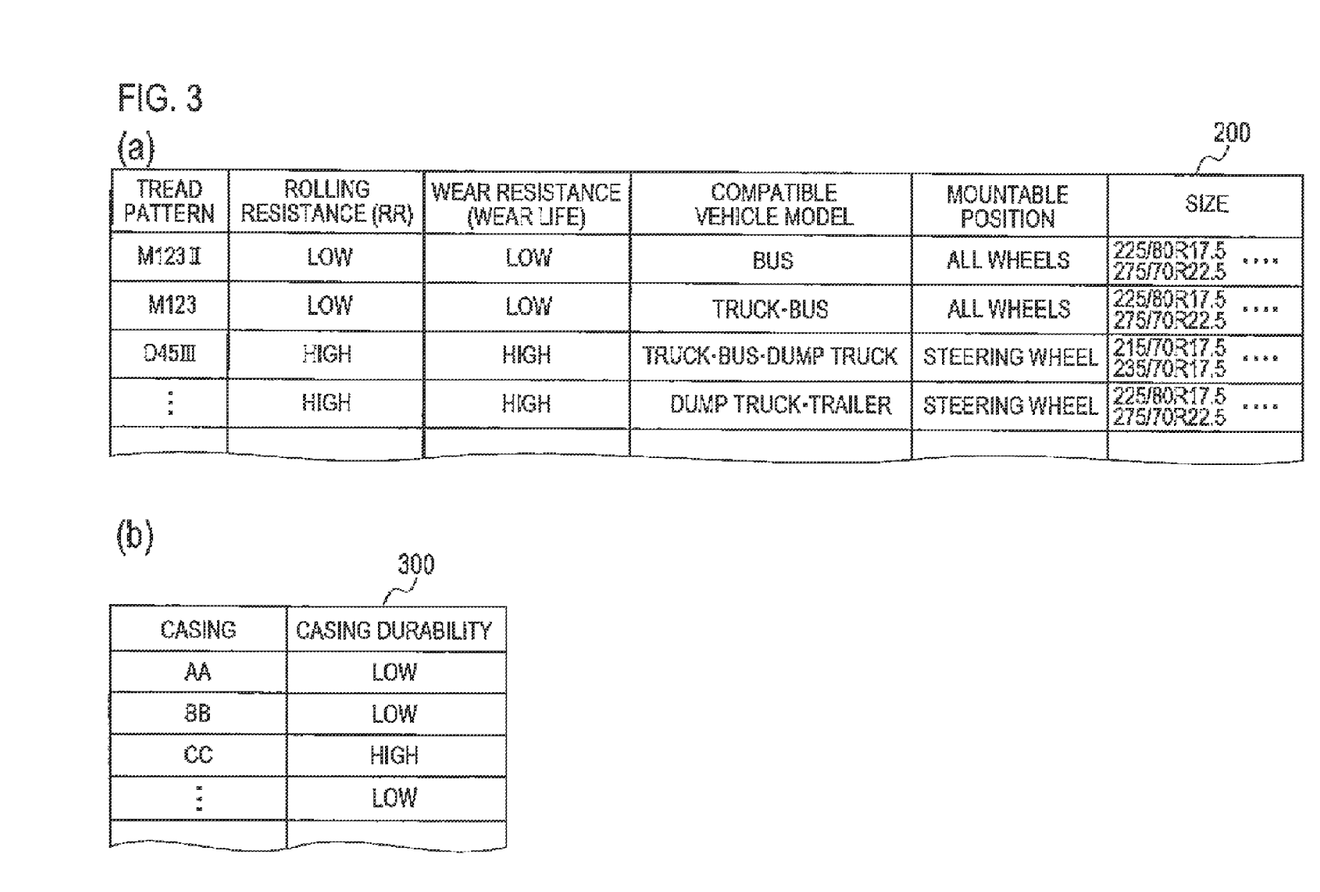
FIG. 3 illustrates an example of a tread database 200 and a casing database 300 according to the embodiment of the present invention.

More specifically, the selection unit 107 selects a tread and a casing that fulfill the required performance, with reference to a tread database 200 regarding the treads and a casing database 300 regarding the casings.

FIG. 3(a) illustrates an example of the tread database 200 and FIG. 3(b) illustrates an example of the casing database 300. As illustrated in FIG. 3(a), the tread database 200 includes fields for tread pattern names, rolling resistance (RR), wear resistance (wearing life), compatible vehicle models, mountable positions, and sizes. Note that the fields configuring the tread database 200 are not limited to the categories illustrated in FIG. 3(a).

Also, as illustrated in FIG. 3(b), the casing database 300 includes fields for casing names and casing durability. Note that the fields configuring the casing database 300 are not limited to the categories illustrated in FIG. 3(b).

Also, the selection unit 107 is capable of selecting a combination of a tread and a casing based on a response to an inquiry to the user by the inquiry unit 109, as to the recommended tire.

The selection unit 107 has the display unit 111 display the combination of the selected tread and casing, as the recommended tire.

The inquiry unit 109 inquires a priority order of the performance that should be required, to the user of the recommended tire. Specifically, in situations where the rolling resistance and casing durability decided by the performance decision unit 105 contradict each other, the inquiry unit 109 inquires to the user, by displaying predetermined information on the display unit 111, whether to prioritize either the rolling resistance or the casing durability.

Also, the inquiry unit 109 relays the priority order entered by the user through an input interface (not illustrated), to the selection unit 107.

Figure 4:
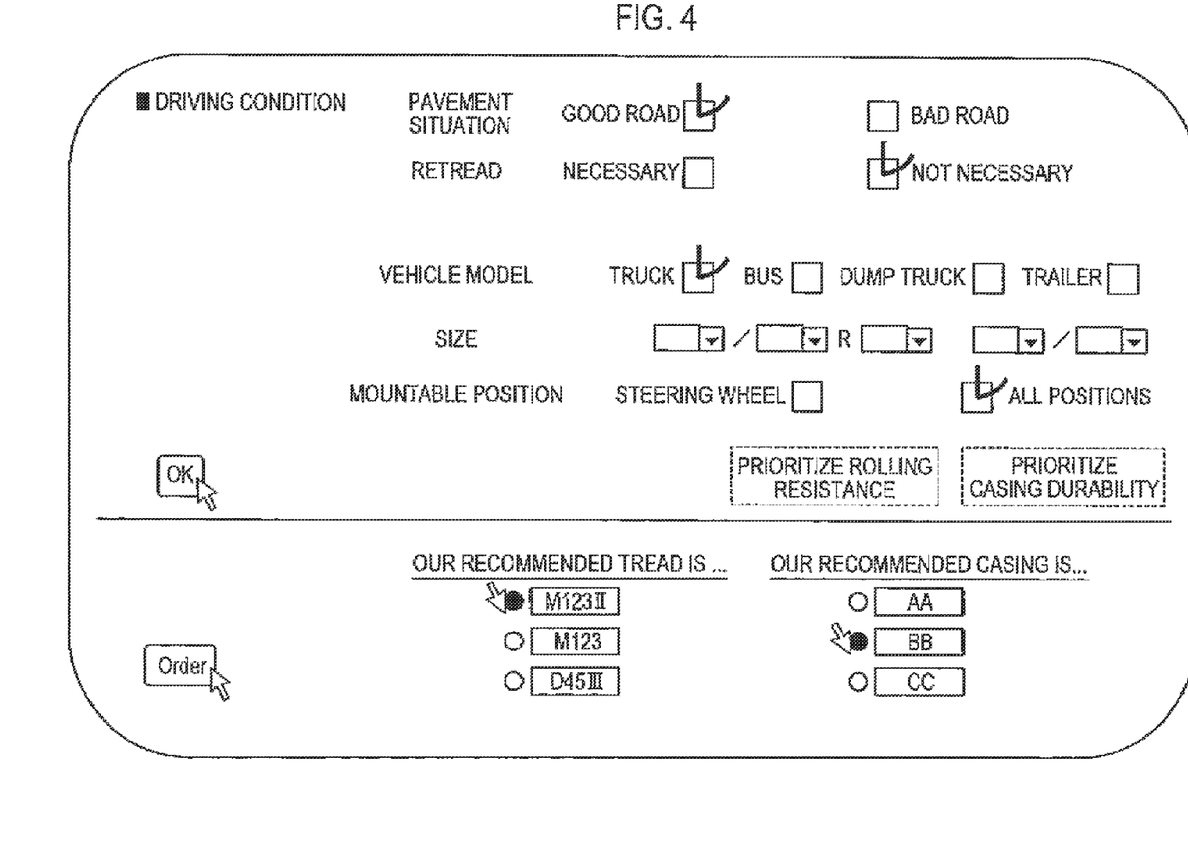
FIG. 4 illustrates an example of an information obtaining screen and a display screen of the recommended tire displayed on a display unit 111, according to the embodiment of the present invention.

The display unit 111 displays a screen for obtaining the above-described driving condition and retread necessity, based on control from the driving condition obtaining unit 101 and the retread necessity obtaining unit 103. FIG. 4 illustrates an example of an information obtaining screen and a display screen of the recommended tire displayed on a display unit 111. As illustrated in FIG. 4, on the display unit 111, checkboxes for obtaining the driving condition and the retread necessity are displayed.

Also displayed in FIG. 4 are checkboxes for obtaining the vehicle model on which the recommended tire is loaded, the tire size, and mounting positions. Further, towards the bottom of the screen illustrated in FIG. 4, the recommended tire (combination of a tread and a casing) is displayed. Note that when the rolling resistance and the casing durability decided by the performance decision unit 105 contradict each other, an area indicated by a dotted line in FIG. 4 ("Prioritize Rolling Resistance", "Prioritize Casing Durability") is displayed. The user can select each one of them.

Figure 5:
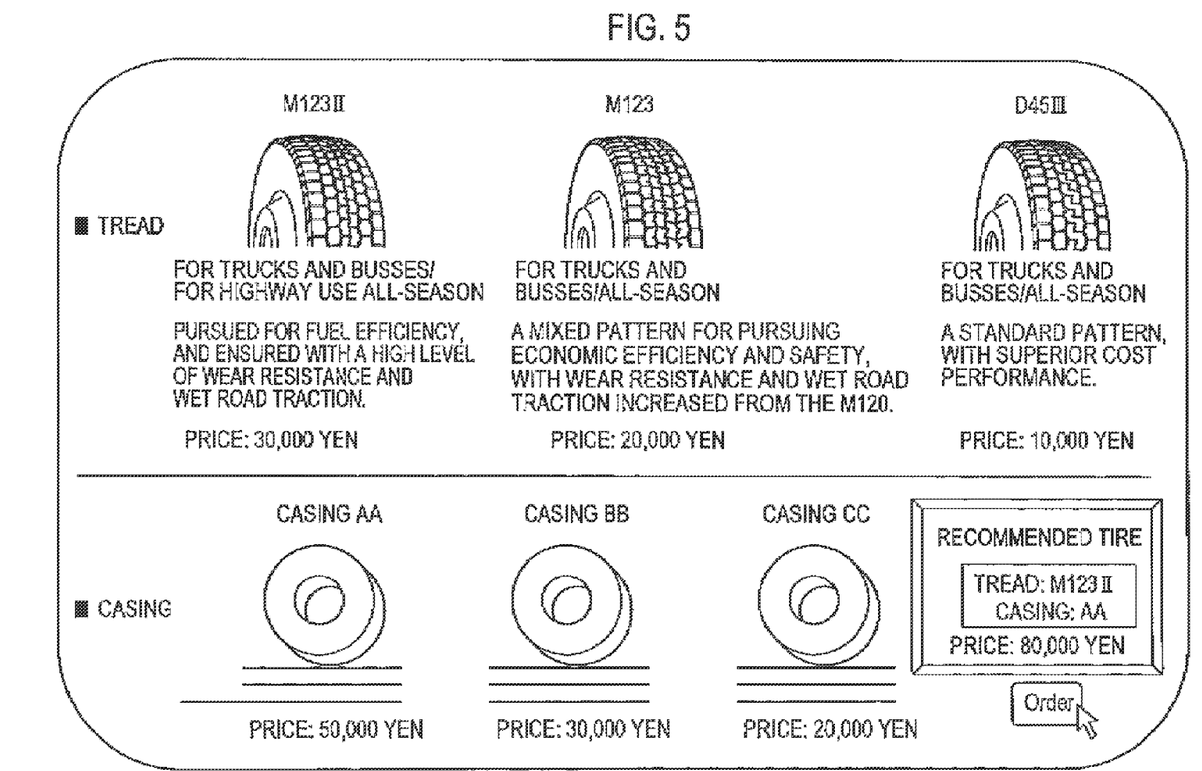
FIG. 5 illustrates an example of a specific display screen of a recommended tire displayed on the display unit 111, according to the embodiment of the present invention.

FIG. 5 illustrates a specific example of a display screen of the recommended tire displayed on the display unit 111. In FIG. 5, a plurality of combinations (three types) of a tread and a casing are displayed. Out of these combinations, a combination of Tread M123II and Casing AA is presented as the recommended tire (see the lower right of FIG. 5).

(2) Operation of the Recommended Tire Selection System

Figure 2:
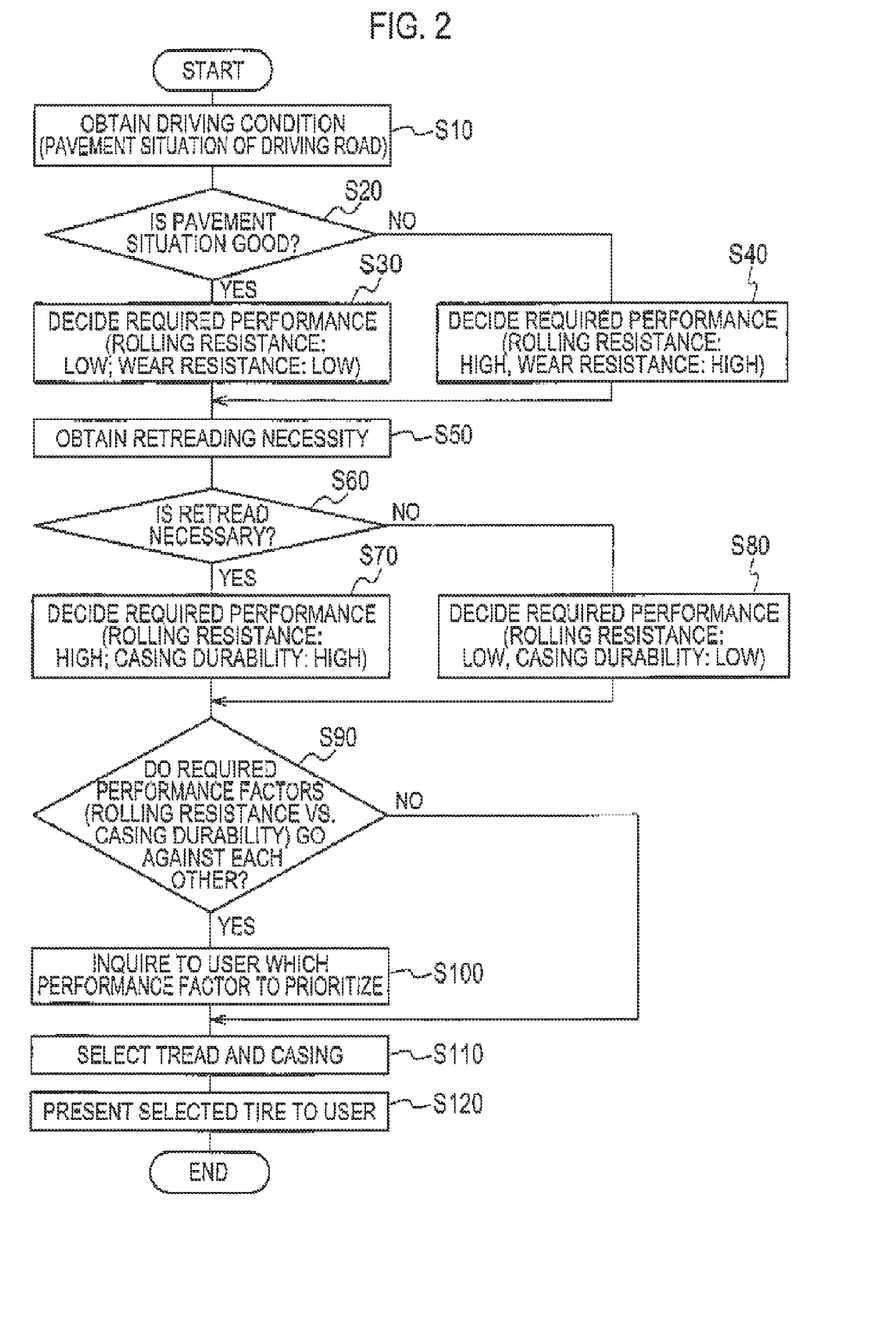
FIG. 2 is a chart illustrating an operation flow of deciding the recommended tire based on the recommended tire selection system 100 according to the embodiment of the present invention.

Next, an operation of the recommended tire selection system 100 will be explained. FIG. 2 illustrates an operation flow of deciding the recommended tire by the recommended tire selection system 100.

As illustrated in FIG. 2, the recommended tire selection system 100 obtains the driving condition of the vehicle on which the recommended tire is loaded, specifically, the pavement situations of the roads on which the vehicle will drives, and decides the required tire performance, depending on the driving condition (steps S10 through S40).

Here, if the pavement situation is good, the low rolling resistance is decided as the required performance, and high wear resistance will not be required. On the other hand, when the pavement situation is not good, the high wear resistance is decided as the required performance, and the low rolling resistance will not be required.

The recommended tire selection system 100 obtains the retread necessity, and depending on the driving condition, decides the required tire performance (steps S50 through S80).

Here, in cases where retread is necessary, the high casing durability is decided as the required performance, and the low rolling resistance will not be required. On the other hand, when retread is not necessary, the low rolling resistance is decided as the required performance, and the high casing durability will not be required.

The recommended tire selection system 100 determines whether or not there is a contradiction between the performance requirements for the recommended tire (step S90). Specifically, the recommended tire selection system 100 determines whether or not there is a contradiction between the low rolling resistance decided based on the driving condition and the high casing durability decided based on the retread necessity.

In other words, even if the pavement situation is good and the low rolling resistance is decided as the required performance, when retread is necessary, the high casing durability is also decided as the required performance. In such a case, because the high casing durability and the low rolling resistance contradict each other, it is determined that the two performance factors conflict.

In such a case, the recommended tire selection system 100 inquires to the user which performance factor (the rolling resistance or the casing durability) should be prioritized (step S100). As a result, the recommended tire selection system 100 obtains the performance factor that should be prioritized.

The recommended tire selection system 100 selects a combination of a tread and a casing that can fulfill the performance requirements based on the processing results of up to step S100 (step S110), and presents the selected combination, i.e., the recommended tire, to the user (step S120).

(3) Operation and Effect

According to the recommended tire selection system 100, based on driving conditions of the vehicle and retread necessity, performance requirements for the recommended tire, or specifically, the rolling resistance, the wear resistance, and the casing durability, are decided. Also, a recommended tire, that is a combination of a tread and a casing fulfilling the decided performance requirements, is selected.

For this reason, in cases where it is possible to freely select a combination of a tread and a casing, it is possible to present a recommended tire, that is a combination of an appropriate tread and casing according to a vehicle driving condition, for example.

In this embodiment, in cases where the rolling resistance and the casing durability decided by the performance decision unit 105 contradict each other, by inquiring whether to prioritize the rolling resistance or the casing durability, even when such conflicting performance factors are decided, a recommended tire fulfilling the demands of the user can be presented.

(4) Other Embodiments

So far, the present invention is disclosed through the above embodiment. However, it should not be interpreted that the statements and drawings constituting a part of the present disclosure limit the present invention. From this disclosure, a variety of alternate embodiments, examples, and applicable techniques will become apparent to one skilled in the art.

For example, in the aforementioned embodiment, pavement situations of the road traveled by the vehicle are considered as an example to describe driving conditions. However, this does not have to be limited to pavement situations, and can include factors such as distance traveled by the vehicle per trip (driving distance from the starting location to the destination), or payload.

Also, in the aforementioned embodiment, in cases where the rolling resistance and the casing durability decided by the performance decision unit 105 contradict each other, an inquiry is made concerning which to prioritize the rolling resistance or the casing durability. However, in cases involving such contradiction, instead of inquiring the user, the recommended tire selection system 100 can make the decision on which performance factor to prioritize.

As described above, it is of course that the present invention includes various embodiments and the like not described here. Therefore, the technical range of the present invention is to be defined only by the inventive specific matter according to the adequate claims from the above description.

Note that the entire content of the Japanese Patent Application No. 2010-277356 (filed on Dec. 13, 2010) is incorporated herein by reference.

INDUSTRIAL APPLICABILITY

According to the present invention, it is possible to provide a recommended tire selection system capable of presenting a recommended tire that is a combination of an appropriate tread and casing, depending on a vehicle driving condition and the like.

The invention claimed is:

1. A recommended tire selection system that selects a recommended tire that is a combination of a toric casing including at least a carcass and a bead, and a tread that is pasted onto a peripheral unit of the casing and comes into contact with the road, the system comprising:
   a driving condition obtaining unit configured to ask a user of the recommended tire to set information regarding a driving condition of a vehicle on which the recommended tire is loaded, and to obtain the driving condition based on the information set by the user;
   a retread necessity obtaining unit configured to obtain retread necessity to replace the tread based on remaining groove depth of the tread;

a performance decision unit configured to decide a rolling resistance and a wear resistance of the recommended tire based on the driving condition obtained by the driving condition obtaining unit, and to decide a casing durability based on the retread necessity obtained by the retread necessity obtaining unit; and a selection unit configured to select a recommended tire that is a combination of a tread and a casing, fulfilling the rolling resistance, the wear resistance, and the casing durability, decided by the performance decision unit.

2. The recommended tire selection system according to claim 1, comprising an inquiry unit configured to inquire which to prioritize the rolling resistance or the casing durability, in cases where the rolling resistance and the casing durability decided by the performance decision unit contradict each other.

3. The recommended tire selection system according to claim 1, wherein the driving condition obtaining unit is configured to obtain a pavement situation of the road on which the vehicle drives, as the driving condition.

4. The recommended tire selection system according to claim 2, wherein the driving condition obtaining unit is configured to obtain a pavement situation of the road on which the vehicle drives, as the driving condition.

* * * * *